(12) United States Patent  (10) Patent No.: US 9,627,926 B2
Shanley  (45) Date of Patent: Apr. 18, 2017

(54) BACKUP POWER DEVICE, SYSTEM AND METHOD OF USE

(71) Applicant: James Shanley, Delmar, NY (US)

(72) Inventor: James Shanley, Delmar, NY (US)

( * ) Notice: Subject to any disclaimer, the term of this patent is extended or adjusted under 35 U.S.C. 154(b) by 0 days.

(21) Appl. No.: 14/758,833

(22) PCT Filed: Jan. 14, 2014

(86) PCT No.: PCT/US2014/011390
§ 371 (c)(1),
(2) Date: Jul. 1, 2015

(87) PCT Pub. No.: WO2014/110543
PCT Pub. Date: Jul. 17, 2014

(65) Prior Publication Data
US 2016/0006298 A1  Jan. 7, 2016

Related U.S. Application Data

(60) Provisional application No. 61/752,064, filed on Jan. 14, 2013.

(51) Int. Cl.
*H02J 7/00* (2006.01)
*H02J 9/00* (2006.01)
(Continued)

(52) U.S. Cl.
CPC ............... *H02J 9/061* (2013.01); *H02J 9/04* (2013.01)

(58) Field of Classification Search
CPC ......... H02J 9/04; H02J 9/061; Y10T 307/615; Y10T 307/625
(Continued)

(56) References Cited

U.S. PATENT DOCUMENTS 7,795,756 B2  9/2010  Brown
8,134,437 B2 * 3/2012  Brooks ................ H01F 7/1607
                                                        335/100
(Continued)

FOREIGN PATENT DOCUMENTS

JP  2005124268 A  5/2005
JP  2008125337 A  5/2008
(Continued)

OTHER PUBLICATIONS

International Search Report for PCT/US2014/011390 dated Apr. 16, 2014.
(Continued)

*Primary Examiner* — Carlos Amaya
(74) *Attorney, Agent, or Firm* — Heslin Rothenberg Farley & Mesiti PC; Jacquelyn A. Graff, Esq.

(57) ABSTRACT

The present invention discloses a backup power device, system and method of use. The backup power device includes a panel, a first switch box electrically connected to the panel, a second switch box electrically connected to the panel, a switch box plug for routing electrical power through the panel, and an external power source coupled to the first switch box of the panel to power a connected device. The backup power system includes a service panel connecting a building to a power grid, a hard wired device powered by the service panel, a backup power device, and an external power source providing power for routing through the first switch box of the panel to the hard wired device. The backup power device including a panel, a first switch box, a second switch box, and a switch box plug. A method for using the backup power device is also disclosed.

20 Claims, 4 Drawing Sheets

(51) Int. Cl.
*H02J 9/06* (2006.01)
*H02J 9/04* (2006.01)

(58) Field of Classification Search
USPC .......................................... 307/66
See application file for complete search history.

(56) References Cited

U.S. PATENT DOCUMENTS

| | | | | |
|---|---|---|---|---|
| 2002/0163196 | A1* | 11/2002 | Brofft | B23K 9/1006 290/1 A |
| 2003/0075982 | A1* | 4/2003 | Seefeldt | H02J 9/06 307/29 |
| 2008/0179958 | A1* | 7/2008 | Lathrop | H02J 9/06 307/68 |

FOREIGN PATENT DOCUMENTS

| | | |
|---|---|---|
| JP | 2009071977 A | 4/2009 |
| KR | 2020100001847 U | 2/2010 |

OTHER PUBLICATIONS

Written Opinion of the International Searching Authority dated Apr. 16, 2014.

* cited by examiner

BACKUP POWER DEVICE, SYSTEM AND METHOD OF USE

CROSS-REFERENCE TO RELATED APPLICATION

This application is a National Stage application based on International Application no. PCT/US2014/011390 filed on Jan. 14, 2014 and published as WO 2014/110543 on Jul. 17, 2014. This application also claims priority benefit under 35 U.S.C. §119 (e) of U.S. provisional application no. 61/752,064 filed Jan. 14, 2013, each of which are incorporated herein by reference in their entirety.

FIELD OF THE INVENTION

The present invention relates generally to a backup electrical power device, system and method of use for providing electrical power during a power outage.

BACKGROUND OF THE INVENTION

When temporary power outages occur homes and businesses lose power to run the many devices within the home or business, including, for example, furnaces, air conditioning units, kitchen appliances, and the like. When the temporary power outage lasts for more than a few minutes backup power supplies may be necessary to heat or cool the home or business. Currently available systems for backup power may include permanently installed fully automatic generators or portable generators. The portable generators may be manually connected to a building's sub-panel after the main power has been manually disconnected or alternatively may have devices and appliances plugged directly into the portable generator. Connecting a portable generator to a buildings sub-panel to provide power to, for example, a heating or cooling system may be difficult or impossible for the average user.

SUMMARY OF THE INVENTION

Aspects of the present invention provide a backup power device, system and method of use during a power outage.

In one aspect, provided herein is a backup power device including a panel with a first switch box and a second switch box electrically connected to the panel. The backup power device also includes a switch box plug for routing electrical power through the panel and an external power source coupled to the first switch box of the panel to provide power to a connected device.

In another aspect, provided herein is a backup power system including a service panel connecting a building to a power grid, a hard wired device powered by the service panel, a backup power device connecting the service panel and the hard wired device, and an external power source providing power for routing through the first switch box of the panel to the hard wired device. The backup power device including a panel, a first switch box electrically connected to the panel and the hard wired device, and a second switch box electrically connected to the panel and the service panel. The backup power device also includes a switch box plug for routing electrical power through the panel.

In yet another aspect, provided herein is a method for using the backup power device, including installing a backup power device in a home. The backup power device including a panel, a first switch box electrically connected to the panel and a connected device and a second switch box electrically connected to the panel and a service panel. The backup power device also includes a switch box plug for routing electrical power through the panel and an external power source providing power for routing through the first switch box of the panel to the connected device. The method also includes removing the switch box plug from the second switch box when a power outage occurs, inserting the switch box plug into the first switch box, connecting the panel to the external power source, and activating the external power source to provide power to the connected device.

These, and other objects, features and advantages of this invention will become apparent from the following detailed description of the various aspects of the invention taken in conjunction with the accompanying drawings.

BRIEF DESCRIPTION OF DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention.

DETAILED DESCRIPTION FOR CARRYING OUT THE INVENTION

Generally stated, disclosed herein is a backup power device and system for re-routing power during a power outage in a home or building. Further, a method for using the backup power device is discussed.

Figure 1:
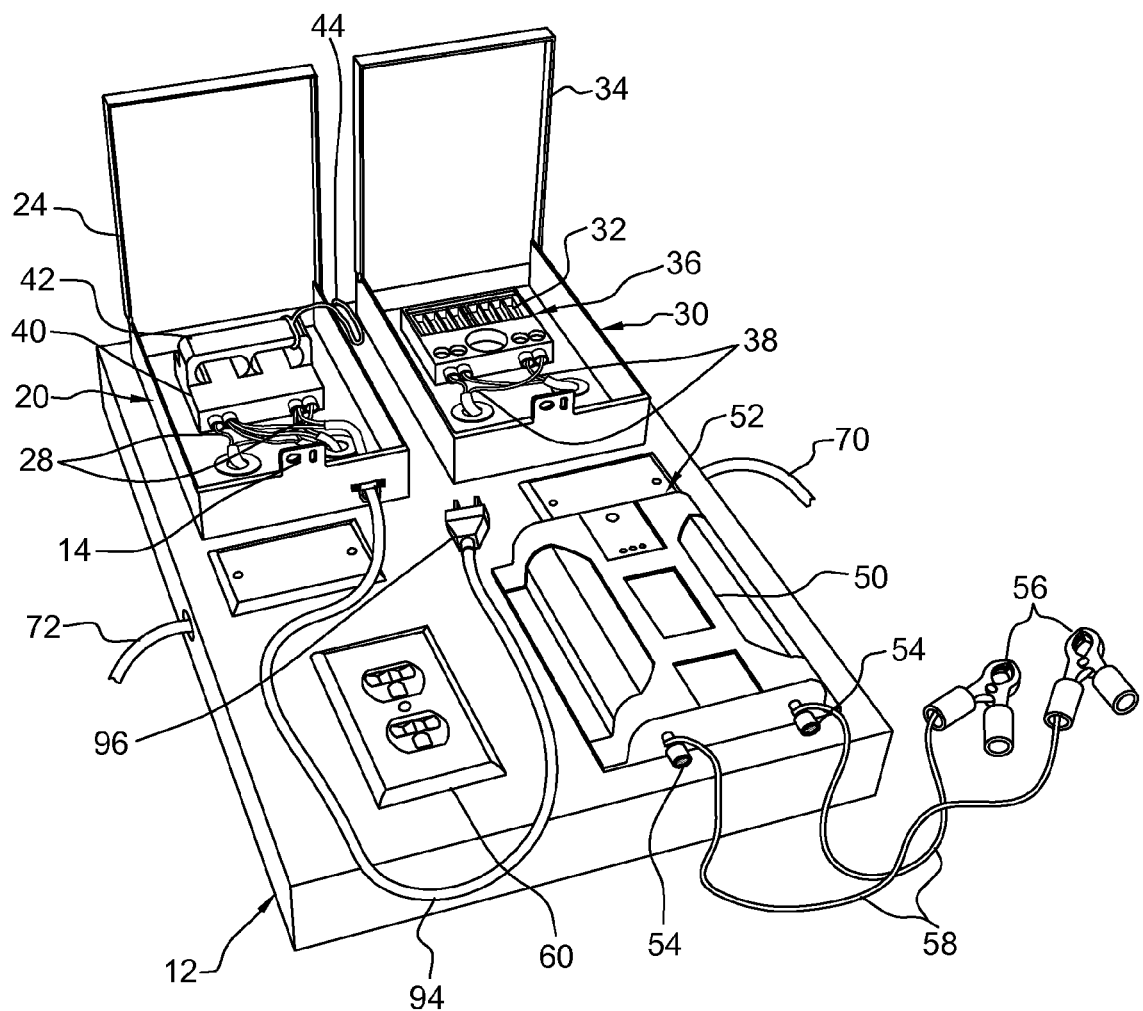
FIG. 1 is an isometric view of an embodiment of the backup power device, in accordance with an aspect of the present invention.

Referring to the drawings, wherein like reference numerals are used to indicate like or analogous components throughout the several views, and with particular reference to FIG. 1, there is illustrated an exemplary embodiment backup power device 10. The backup power device 10 includes a panel 12 with two switch boxes 20, 30, a switch box plug 40, an inverter 50, and a convenience outlet 60 connected to the panel 12. The panel 12 may also include a power cable 70 connecting the backup power device 10 to a service panel 80 and a power cable 72 connecting the backup power device 10 to a home or building device or a hard wired or connected device 82. The terms "service panel," "circuit breaker panel" and "fuse box" may be used interchangeably as they essentially describe the same type of apparatus. The device 82 may, for example, be a heating unit, cooling unit, appliance, or other device which is hard wired into a home or building electrical system.

The switch boxes 20, 30 may include an exterior housing 24, 34 and an inner outlet 26, 36 including a plurality of electrical connectors 22, 32. The plurality of electrical connectors 22, 32 in the inner outlet 26, 36 may be electrically connected to the power cables 70, 72 by wires 28, 38. The switch boxes 20, 30 may also include a locking mechanism 14 to secure the switch boxes 20, 30 in the closed position. The switch box 20 may also include an auxiliary line 94 extending out of the switch box 20 at a first end and terminating at a plug 96 at a second end.

The plug 40 may include a handle 42 and electrical connections for connecting to the switch boxes 20, 30. The plug 40 may also be attached to the panel 12 by a connection device 44, which may be attached to the handle 42 of the plug 40. The connection device 44 may help a user avoid losing the plug 40 when switching from switch box 20 to switch box 30, or vice versa. The switch boxes 20, 30 may, for example, include a plurality of electrical connectors 22, 32 for mating with the electrical connections of the plug 40 enabling power to pass through the backup power device 10. The plug 40 may, for example, be inserted into switch box 20. When the plug 40 is inserted, for example, into the switch box 20 and an external power source 90 is connected to the panel 12, power passes from the external power source 90 to the connected device 82. When plug 40 is inserted, for example, into the switch box 30 power passes from the service panel 80 through the backup power device 10 to the connected device 82.

The inverter 50 may include at least one outlet 52 in, for example, a top portion or first portion of the inverter 50 and two terminals 54 on, for example, the bottom portion or second portion of the inverter 50. The two terminals 54 may be connected to two clamps 56 by two wires 58. The inverter may be, for example a DC to AC inverter. During a power outage, the two clamps 56 may be connected to an external power source 90, for example, a battery, such as, an RV battery.

The convenience outlet 60 may be powered by both the service panel 80 and an external power source 90 to provide the user an additional outlet. The external power source 90 may be connected by the plug 96 of the auxiliary line 94 through the inverter 50. Alternatively, the plug 96 of the auxiliary line 94 may be, for example, directly connected to a second external power source 92, such as, a portable generator, to provide power to the connected device 82 when the power goes out and the plug 40 is inserted into the switch box 20.

Figure 2:
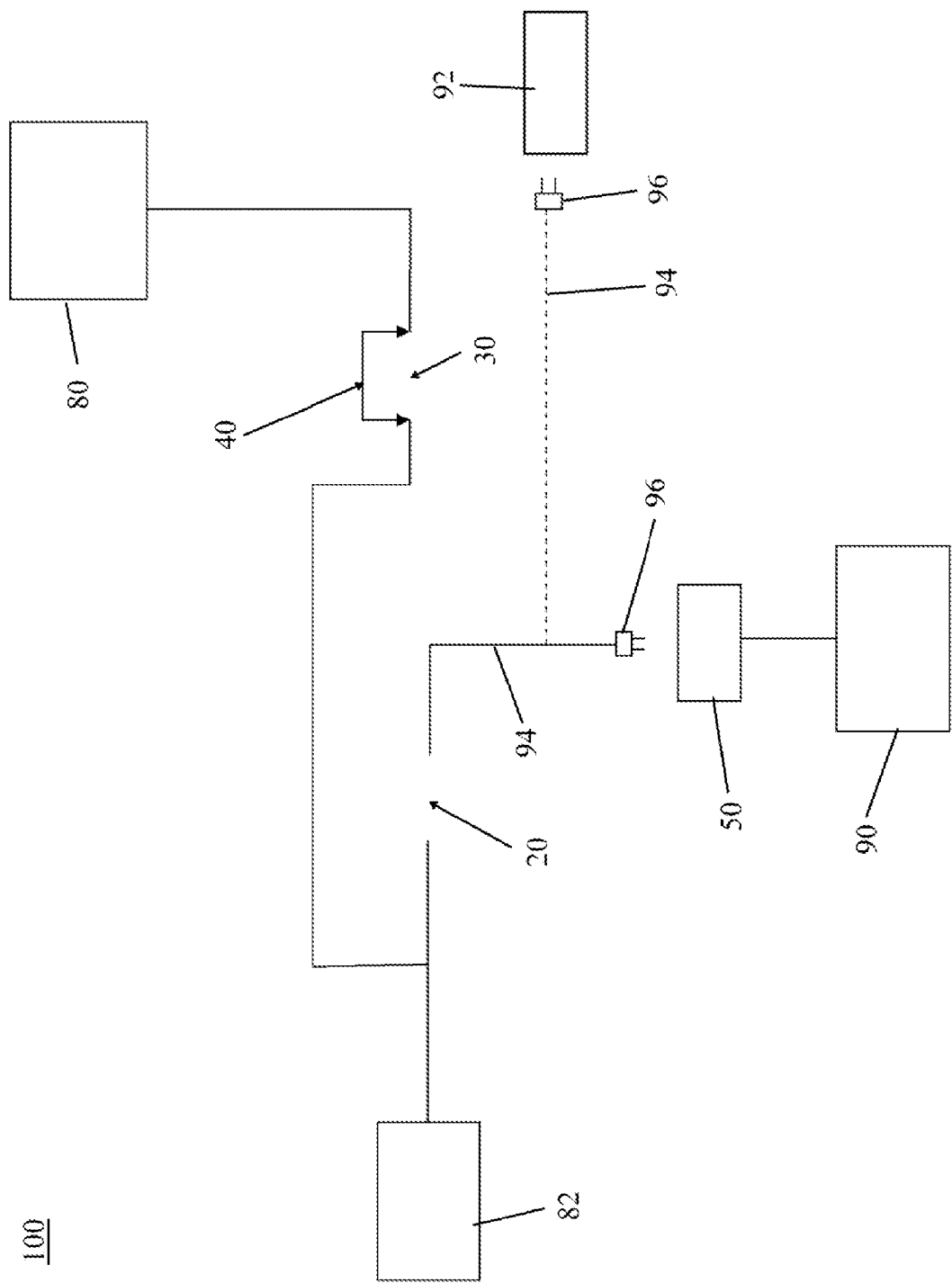
FIG. 2 is an electrical block diagram showing a backup power system including a backup power device in a normal operating condition, in accordance with an aspect of the present invention.

Referring now to FIG. 2, a backup power system 100 is shown during normal circumstances when power to the service panel 80 is active. FIG. 2 shows a home or building with the plug 40 inserted into switch box 30 and power running through the service panel 80 to the home or building. When the plug 40 is inserted into switch box 30 power comes from the power grid into the home or building through the service panel 80 and passes through the backup power system 100 to the connected devices 82 in the home. For example, and with reference to FIGS. 1 and 2, the power will pass into the home or building through service panel 80, from the service panel 80 through power cable 70 to the panel 12, through the panel 12 via switch box 30, and out of the panel 12 through power cable 72 to the connected device 82.

Figure 3:
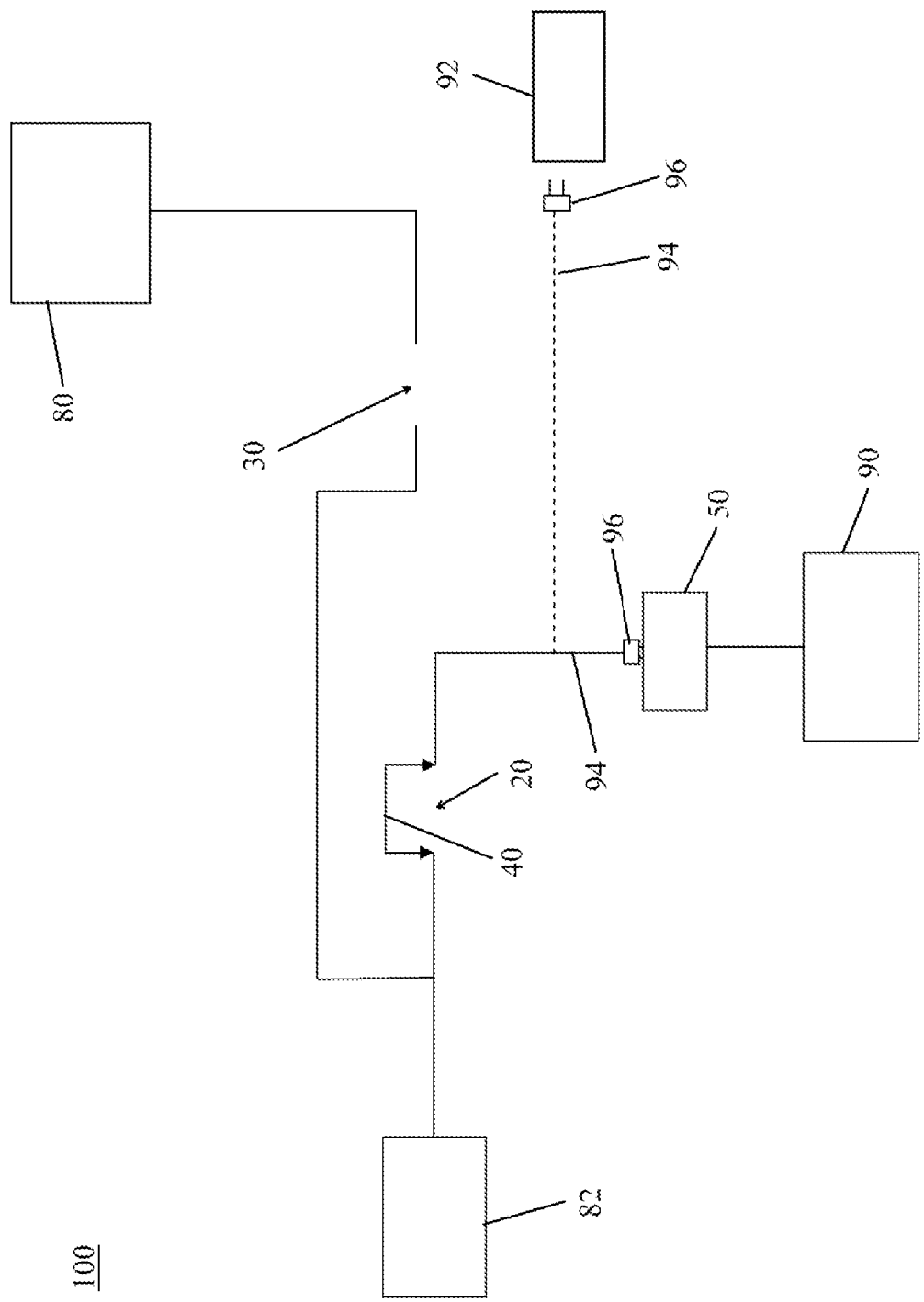
FIG. 3 is an electrical block diagram showing the backup power system of FIG. 2 in a backup operating condition during a power outage, in accordance with an aspect of the present invention.

Referring now to FIGS. 2 and 3, the method of using the backup power system 100 when a temporary power outage occurs is shown. In order for the backup power system 100 to provide backup power to devices in a home or building, it must first be electrically connected to the home or building. For example, if it was desirable to have the backup power system 100 provide power to a home or building heating system during a power outage, the power line from the service panel 80 to the, for example, heating unit 82 would be re-routed to the panel 12 of the backup power device 10. As illustrated in FIGS. 2 and 3, the power lines or cables 70 and 72 have been re-routed to connect the service panel 80 to a connected device 82, such as a heating unit. By inserting the panel 12 between a hard wired device 82 and the service panel 80, the device 82, for example, the heating unit is converted from a device that is hard wired to the service panel 80 to a device that can be plugged into a backup power source 90, 92. Once the backup power system 100 has been installed in a home or building it may be used during a power outage.

The method for using the backup power system 100 may include unplugging the plug 40 from the switch box 30 and plugging the plug 40 into the switch box 20, as shown in FIGS. 2 and 3. Next the plug 96 may be plugged into the at least one outlet 52 in the inverter 50. Then the two clamps 56, which are or may be connected to the two terminals 54 by wires 58, may be connected to the external power source 90, for example, an RV battery or the like. Once the external power source 90 is connected to the inverter 50 power may be available to run the connected device 82.

Alternatively, instead of plugging the plug 96 into the inverter 50, the plug 96 may be plugged into a second external power source 92, for example, a portable generator. Once the plug 96 is plugged into the second external power source 92, the power source 92 may be started and power supplied to the connected device 82.

When the temporary power outage is over the external power source 90 or second external power source 92 may be disconnected by removing the plug 96 from the inverter 50 or the power source 92, respectively. Once the power source 90, 92 is disconnected the plug 40 may be unplugged from switch box 20 and reinserted into switch box 30. After inserting the plug 40 into switch box 30 the connected device 82 will again receive power from the power grid through the service panel 80.

Figure 4:
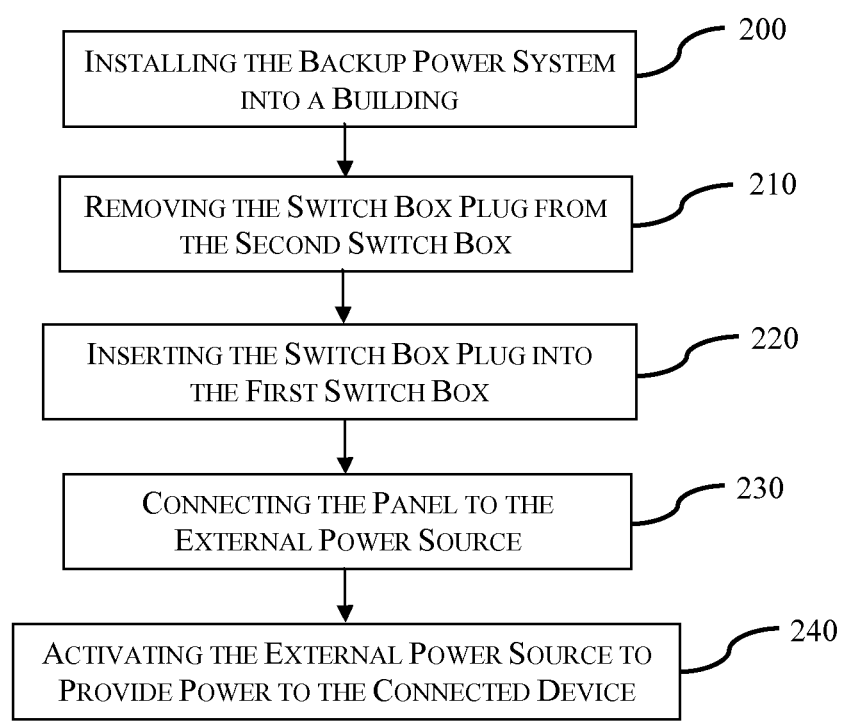
FIG. 4 depicts a one embodiment of a method for using a backup power device, in accordance with an aspect of the present invention.

As discussed in greater detail above and shown in FIG. 4, the method may include installing a backup power system into a building 200, removing the switch box plug from the second switch box of the backup power system 210, inserting the switch box plug into the first switch box 220, connecting the panel to the external power source 230, and activating the external power source to provide power to the connected device 240.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The invention has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

Having thus described the preferred embodiments, the invention is now claimed to be:

1. A backup power device, comprising:
   a panel;
   a first switch box electrically connected to the panel;
   a second switch box electrically connected to the panel;
   a switch box plug for routing electrical power through the panel; and
   an external power source coupled to the first switch box of the panel to provide power to a connected device;
   a plug for connecting the external power source to the panel; and
   an inverter coupled to the panel, the inverter comprising:
      at least one outlet on a first portion of the inverter and configured to receive the plug;
      at least two terminals on a second portion of the inverter; and
      at least two wires each configured to connect the at least two terminals to at least two clamps, the at least two clamps configured to couple to the external power source.

2. The backup power device of claim 1, wherein the switch box plug comprises:
   a handle; and
   a plurality of electrical connections configured to electrically connect to at least one of the first switch box and the second switch box.

3. The backup power device of claim 1, wherein the external power source is selected from at least a battery and a portable generator.

4. The backup power device of claim 1, further comprising:
   a convenience outlet.

5. The backup power device of claim 1, wherein the first switch box comprises:
   an exterior housing;
   an inner outlet positioned inside the exterior housing, the inner outlet comprising a plurality of electrical connectors configured to couple to the plurality of electrical connections of the switch box plug;
   a locking mechanism configured to secure the exterior housing in a closed position; and
   an auxiliary line electrically connected to the plurality of electrical connections of the inner outlet at a first end and comprising a plug at a second end; and
   wherein the second switch box comprises:
   an exterior housing;
   an inner outlet positioned inside the exterior housing, the inner outlet comprising a plurality of electrical connectors configured to couple to the plurality of electrical connections of the switch box plug; and
   a locking mechanism configured to secure the exterior housing in a closed position.

6. A backup power device, comprising:
   a panel;
   a first switch box electrically connected to the panel;
   a second switch box electrically connected to the panel;
   a switch box plug for routing electrical power through the panel, the switch box plug comprising:
      a handle; and
      a plurality of electrical connections configured to electrically connect to at least one of the first switch box and the second switch box; and
   an external power source coupled to the first switch box of the panel to provide power to a connected device;
   wherein the first switch box comprises:
      an exterior housing;
         an inner outlet positioned inside the exterior housing, the inner outlet comprising a plurality of electrical connectors configured to couple to the plurality of electrical connections of the switch box plug;
         a locking mechanism configured to secure the exterior housing in a closed position; and
         an auxiliary line electrically connected to the plurality of electrical connections of the inner outlet at a first end and comprising a plug at a second end.

7. The backup power device of claim 6, wherein the second switch box comprises:
   an exterior housing;
   an inner outlet positioned inside the exterior housing, the inner outlet comprising a plurality of electrical connectors configured to couple to the plurality of electrical connections of the switch box plug; and
   a locking mechanism configured to secure the exterior housing in a closed position.

8. The backup power device of claim 6, wherein the external power source is selected from at least a battery and a portable generator.

9. The backup power device of claim 6, further comprising:
   a convenience outlet.

10. A backup power system, comprising:
    a service panel connecting a building to a power grid;
    a hard wired device powered by the service panel;
    a backup power device connecting the service panel and the hard wired device, the backup power device comprising:
       a panel;
       a first switch box electrically connected to the panel and the hard wired device;
       a second switch box electrically connected to the panel and the service panel; and
       a switch box plug for routing electrical power through the panel;
       a plug configured to electrically connect the backup power device to an external power source; and
       an inverter coupled to the panel, wherein the inverter comprises:
          at least one outlet on a top portion of the inverter and configured to receive the plug;
          at least two terminals on a bottom portion of the inverter; and
          at least two wires configured to connect the at least two terminals to at least two clamps, the at least two clamps configured to couple to the external power source; and
    the external power source providing power for routing through the first switch box of the panel to the hard wired device.

11. The backup power system of claim 10, wherein the external power source is selected from a battery and a portable generator.

12. A backup power system, comprising:
a service panel connecting a building to a power grid;
a hard wired device powered by the service panel;
a backup power device connecting the service panel and the hard wired device, the backup power device comprising:
   a panel;
   a first switch box electrically connected to the panel and the hard wired device:
   a second switch box electrically connected to the panel and the service panel;
   a switch box plug for routing electrical power through the panel; and
   an auxiliary line electrically connected to the first switch box at a first end and comprising a plug at a second end; and
an external power source providing power for routing through the first switch box of the panel to the hard wired device.

13. The backup power system of claim 12, wherein the external power source is selected from a battery and a portable generator.

14. A method for using a backup power device, comprising:
installing the backup power device in a building, the backup power device, comprising:
   a panel;
   a first switch box electrically connected to the panel and a connected device;
   a second switch box electrically connected to the panel and a service panel;
   a switch box plug for routing electrical power through the panel;
   an external power source providing power for routing through the first switch box of the panel to the connected device;
   a plug for connecting the external power source to the panel; and
   an inverter coupled to the panel, the inverter comprising:
      at least one outlet configured to receive the plug; and
      at least two clamps configured to couple to the external power source:
removing the switch box plug from the second switch box when a power outage occurs;
inserting the switch box plug into the first switch box;
connecting the panel to the external power source; and
activating the external power source to provide power to the connected device.

15. The method of claim 14, wherein connecting the panel to the external power source is selected from at least:
inserting the plug into the inverter and connecting the clamps of the inverter to the external power source; and
inserting the plug into the external power source.

16. The method of claim 14, further comprising:
disconnecting the backup power device from the building.

17. The method of claim 16, wherein disconnecting the backup power device from the building, comprises:
removing the plug from the external power source;
removing the switch box plug from the first switch box; and
inserting the switch box plug into the second switch box.

18. A method for using a backup power device, comprising:
installing the backup power device in a building, the backup power device, comprising:
   a panel;
   a first switch box electrically connected to the panel and a connected device;
   a second switch box electrically connected to the panel and a service panel;
   a switch box plug for routing electrical power through the panel; and
   an external power source providing power for routing through the first switch box of the panel to the connected device;
   wherein the first switch box comprises:
      an exterior housing;
      an inner outlet positioned inside the exterior housing, the inner outlet comprising a plurality of electrical connectors configured to couple to the plurality of electrical connections of the switch box plug;
      a locking mechanism configured to secure the exterior housing in a closed position; and
      an auxiliary line electrically connected to the plurality of electrical connections of the inner outlet at a first end and comprising a plug at a second end;
removing the switch box plug from the second switch box when a power outage occurs;
inserting the switch box plug into the first switch box;
connecting the panel to the external power source; and
activating the external power source to provide power to the connected device.

19. The method of claim 18, further comprising:
disconnecting the backup power device from the building.

20. The method of claim 19, wherein disconnecting the backup power device form the building comprises:
removing the plug for the external power source;
removing the switch box plug from the first switch box; and
inserting the switch box plug into the second switch box.

* * * * *